(12) United States Patent
Mikkaichi et al.

(10) Patent No.: US 6,974,181 B2
(45) Date of Patent: Dec. 13, 2005

(54) VEHICLE ROOF MOLDING

(75) Inventors: Toshiki Mikkaichi, Yokohama (JP); Toshiya Yoshida, Yokohama (JP)

(73) Assignee: Hashimoto Forming Industry Company Limited, Yokohama (JP)

( * ) Notice: Subject to any disclaimer, the term of this patent is extended or adjusted under 35 U.S.C. 154(b) by 0 days.

(21) Appl. No.: 10/889,612

(22) Filed: Jul. 12, 2004

(65) Prior Publication Data

US 2005/0011158 A1    Jan. 20, 2005

(30) Foreign Application Priority Data

Jul. 14, 2003    (JP)  .............................. 2003-196520

(51) Int. Cl.$^7$ .............................................. B60J 7/00
(52) U.S. Cl. ....................................... 296/210; 296/213
(58) Field of Search ................................ 296/210, 213

(56) References Cited

U.S. PATENT DOCUMENTS

| | | | | |
|---|---|---|---|---|
| 4,222,508 A | * | 9/1980 | Bott | ............................ 224/324 |
| 4,427,141 A | * | 1/1984 | Bott | ............................ 224/326 |
| 4,501,385 A | * | 2/1985 | Bott | ............................ 224/319 |
| 5,575,527 A | * | 11/1996 | Pfister | ........................ 296/213 |
| 5,948,508 A | * | 9/1999 | Pastore et al. | ............... 428/156 |
| 6,568,748 B2 | * | 5/2003 | Yoon | ........................... 296/210 |
| 6,668,430 B2 | * | 12/2003 | Ichimaru | ...................... 24/457 |
| 6,695,397 B2 | * | 2/2004 | Kamiya et al. | .............. 296/210 |
| 6,709,048 B2 | * | 3/2004 | Nagashima et al. | ......... 296/210 |
| 6,877,798 B2 | * | 4/2005 | Nakajima et al. | ........... 296/210 |

FOREIGN PATENT DOCUMENTS

| | | | | |
|---|---|---|---|---|
| JP | 5133413 | | 5/1993 | |
| JP | 7329654 | | 12/1995 | |
| JP | 2002002401 A | * | 1/2002 | ........... B60R 13/04 |
| JP | 2003182466 A | * | 7/2003 | ........... B60R 13/04 |
| JP | 2004106731 A | * | 4/2004 | ........... B60R 13/04 |

* cited by examiner

Primary Examiner—Kiran B. Patel
(74) Attorney, Agent, or Firm—Kolisch Hartwell, P.C.

(57) ABSTRACT

In this vehicle roof molding, a molding body has shelf sections formed relative to the widthwise direction so as to oppose a bottom surface of an upper wall separated by an interval, and a slide plate is movably installed so as to be able to slide along the longitudinal direction of the molding body at a location opposing an opening of the shelf sections, and slide plate has elastic sections that protrude towards the shelf sections and force the slide plate towards the upper wall by receiving a reactive force from the shelf sections. Opening can be opened and closed by sliding slide plate.

6 Claims, 18 Drawing Sheets

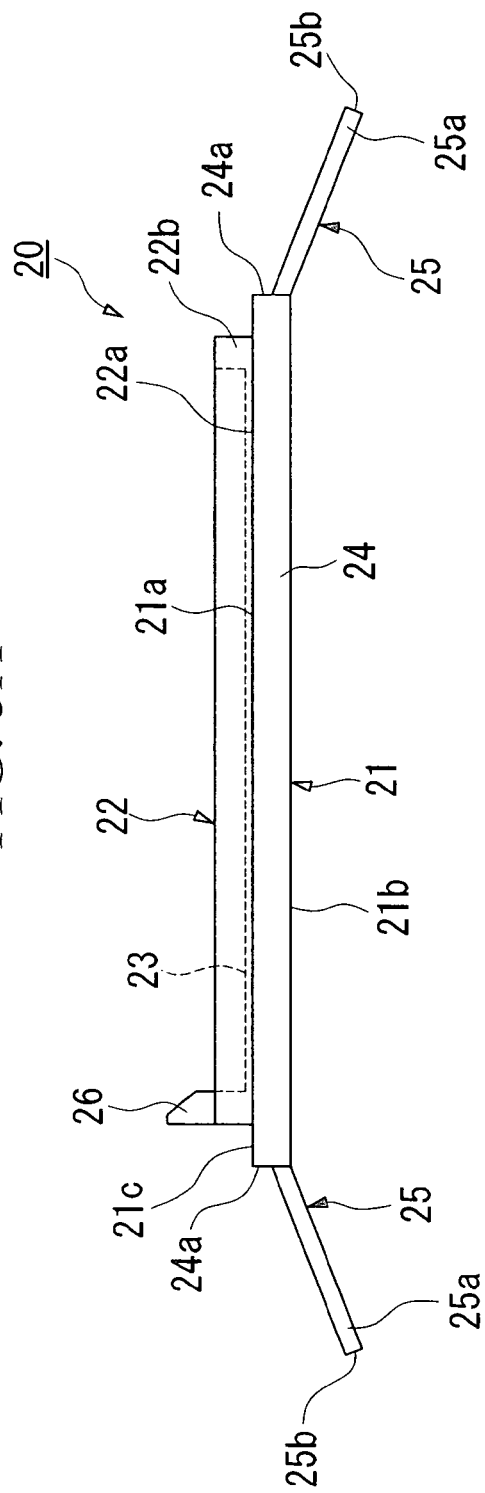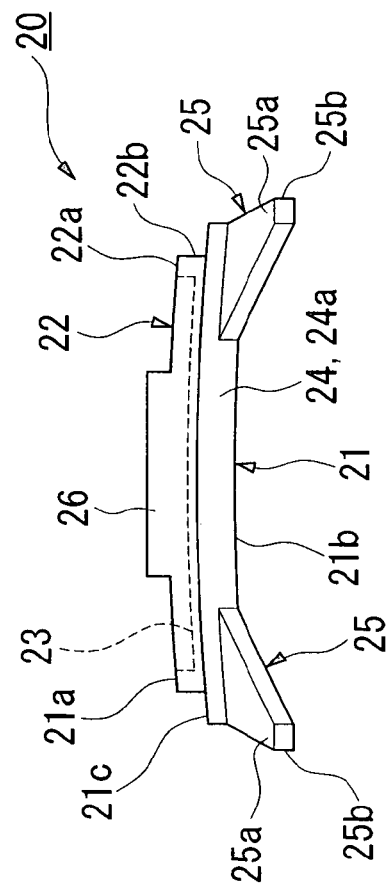
FIG. 5A
FIG. 5B

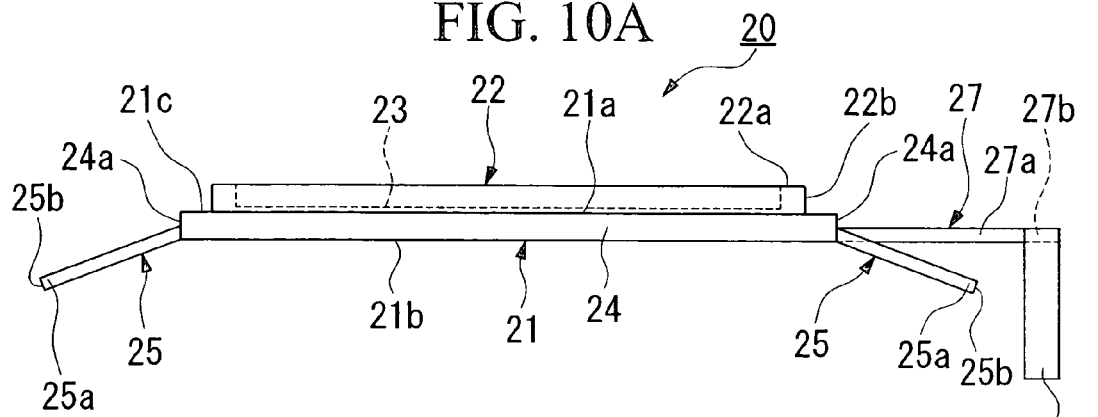
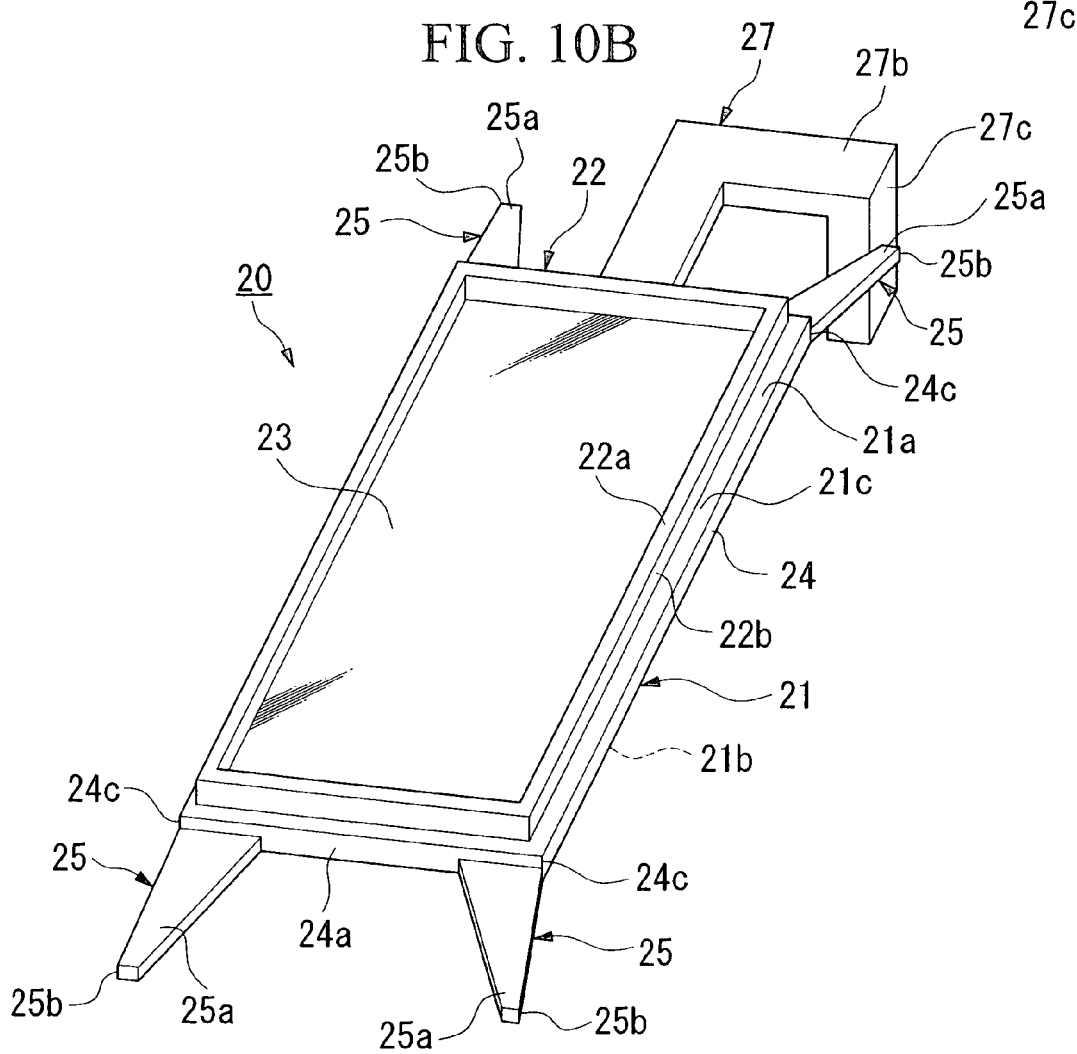

VEHICLE ROOF MOLDING

BACKGROUND OF THE INVENTION

1. Field of the Invention

The present invention relates to a vehicle roof molding having a slide plate for opening and closing an opening.

This application is based on Japanese Patent Application No. 2003-196520, the contents of which are incorporated herein by reference.

2. Description of the Related Art

In the past, an opening was provided in a roof molding attached to the roof of an automobile or other vehicle, and mounting parts for attaching rooftop parts such as roof rails, roof ski rack or roof luggage carrier were known to be fastened by insertion into the opening. The opening was covered by a suitable cover (e.g., cap) in the case of not attaching rooftop parts to the roof.

Known examples of covers for covering the opening of a roof molding included a cover having a window that is formed continuous with the opening and a slide plate that opens and closes the window. According to this type of cover, by opening the window by sliding the slide plate, rooftop parts can be attached without having to remove the cover (see, for example, Japanese Patent No. 3318046, and Japanese Unexamined Patent Application, First Publication No. 7-329654).

In the case of the aforementioned sliding cover, extraneous costs are incurred as a result of being composed of two parts consisting of a cover having a window (cover body) and a slide plate.

In addition, together with a level difference being formed between the edges of the opening of the molding and the cover body, a level difference is also formed between the plate body and the slide plate, and these two level differences result in an unattractive appearance.

Although hook-shaped (groove-shaped) guides are provided opening towards the inside in both sides in the widthwise direction of the cover body, when molding the cover body by injection molding and so forth, since the groove sections of the guides are undercut, a slide type is required for the metal mold that forms them, thereby resulting in higher metal mold costs.

Since the aforementioned guides are provided on both sides in the widthwise direction of the window, the opening width of the window is wide and difficult to handle. Consequently, when bolts and so forth are inserted into the window, the bolts end up contacting the edges of the opening, thereby possibly damaging the molding or chassis and so forth.

A locking plate provided near one end of the window in the lengthwise direction has a gap into which the slide plate can be inserted between the locking plate and the cover body, and since the peripheral guides obstruct the formation of this gap, the locking plate and cover body cannot be integrally molded. Thus, a separately molded locking plate must be attached to the cover body, thereby resulting in increased costs.

Since the slide plate employs a structure in which it is hidden behind the cover body when the window is opened, the size of the opening of the roof molding is required to be at least twice the size of the window required for attaching rooftop parts (e.g., roof rails). Consequently, as a result of a large opening being formed in the roof molding, there is insufficient rigidity thereby resulting in the risk of breakage in the vicinity of the opening when the roof molding is installed.

In addition, since the length of the cover body becomes long, there is the risk of it becoming detached from the opening due to thermal contraction in the lengthwise direction. In the cover described in Japanese Unexamined Patent Application, First Publication No. 7-329654, one end of the cover body is fused to the molding, and the other end engages with the edge of the opening. However, since both the structure and production process are complex, costs ends up increasing.

SUMMARY OF THE INVENTION

In consideration of the aforementioned circumstances, the object of the present invention is to provide a vehicle roof molding that enables the parts that open and close the opening of the molding to be integrally molded, and the size of the opening to be made small.

In order to solve the aforementioned problems, the present invention provides a vehicle roof molding comprising an elongate molding body having an upper wall in which an opening is formed in the outer surface thereof and a slide plate to open and close the opening; wherein, the molding body has shelf sections formed relative to the widthwise direction so as to oppose and be apart from a reverse surface of the upper wall, and the slide plate is movably installed on the shelf sections corresponding to said opening so as to be able to slide along the longitudinal direction of the molding body; and, the slide plate has elastic sections that protrude towards the shelf sections and bias the slide plate towards the upper wall by receiving a reactive force from the shelf sections.

In this vehicle roof molding, the shelf sections can be formed by fold back parts that are bent inwardly from the upper wall in the cross-sectional direction of the upper wall.

The slide plate can have a tab, which abuts against the edge of the opening when the slide plate is positioned at an open position of the opening, on the outer surface of the slide plate.

The slide plate can have an engaging section that engages with the edge of the opening and forms substantially a surface which is flush with the upper wall in the position the slide plate is positioned at closed position of the opening.

The molding body may have sidewalls extending from the shelf sections on both sides which are formed in the molding body over the entire length thereof, and the sidewalls abut against concave groove bottom walls formed in the body panel.

Moreover, the molding body may have a notch that is formed at the position corresponding to the opening in one or both of the sidewalls. The slide plate also has a projection, on the edge or reverse surface thereof, capable of abutting against the edge of the notch when the slide plate is moved to the open position.

BRIEF DESCRIPTION OF THE DRAWINGS

FIG. 5A is a front view, and FIG. 5B is a side view showing an example of a slide plate.

FIG. 10A is a front view and FIG. 10B is a perspective view showing a slide plate in a second embodiment of the roof molding of the present invention.

DETAILED DESCRIPTION OF THE PREFERRED EMBODIMENTS

The following provides a detailed explanation of the present invention based on its embodiments.

Figure 1:
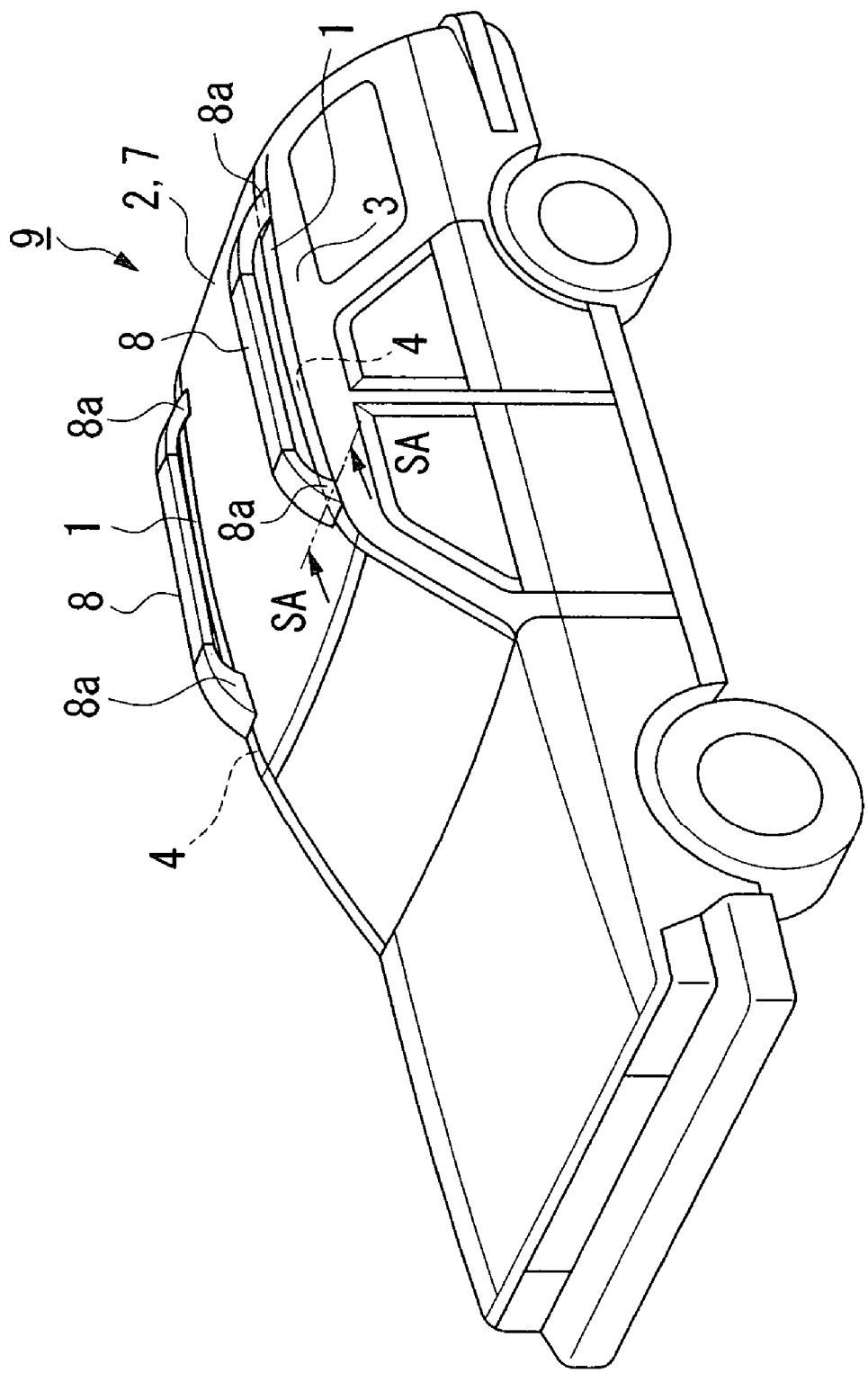
FIG. 1 is an external perspective view showing an example of an automobile (vehicle) on which the roof molding of the present invention has been attached.

FIG. 1 is an external perspective view showing an example of an automobile (vehicle) on which the vehicle roof molding of the present invention (or simply, roof molding) is attached. FIGS. 2 through 9 are drawings for explaining a first embodiment of the vehicle roof molding of the present invention.

In FIG. 1, concave grooves 4 are formed in both sides of a roof 7 of an automobile (vehicle) 9 extending in the direction of vehicle length. Roof moldings 1 are attached along these concave grooves 4 so as cover them from the outside.

Figure 2:
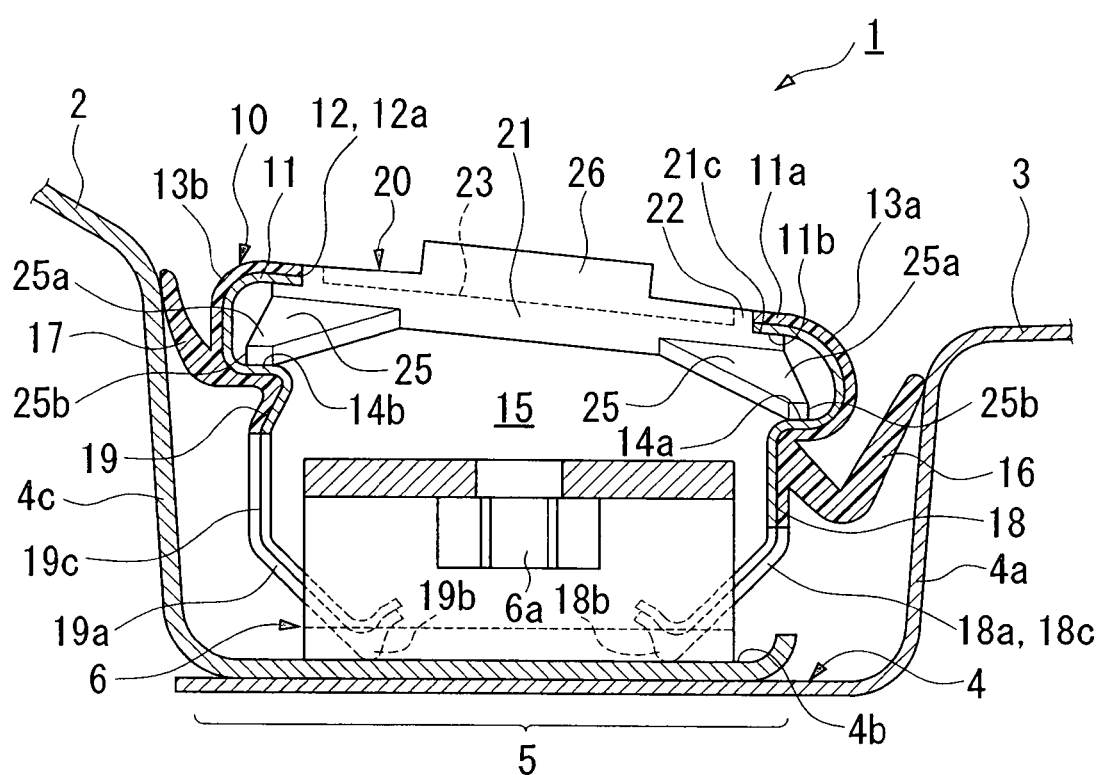
FIG. 2 is a horizontal cross-sectional view taken along line SA—SA of FIG. 1 showing the vicinity of a mounting section for rooftop parts.

As shown in FIG. 2, concave grooves 4 are formed in a body panel of vehicle 9 (and more specifically, in a joined section 5 between a roof outer panel 2 and a pillar outer panel 3).

Figure 3:
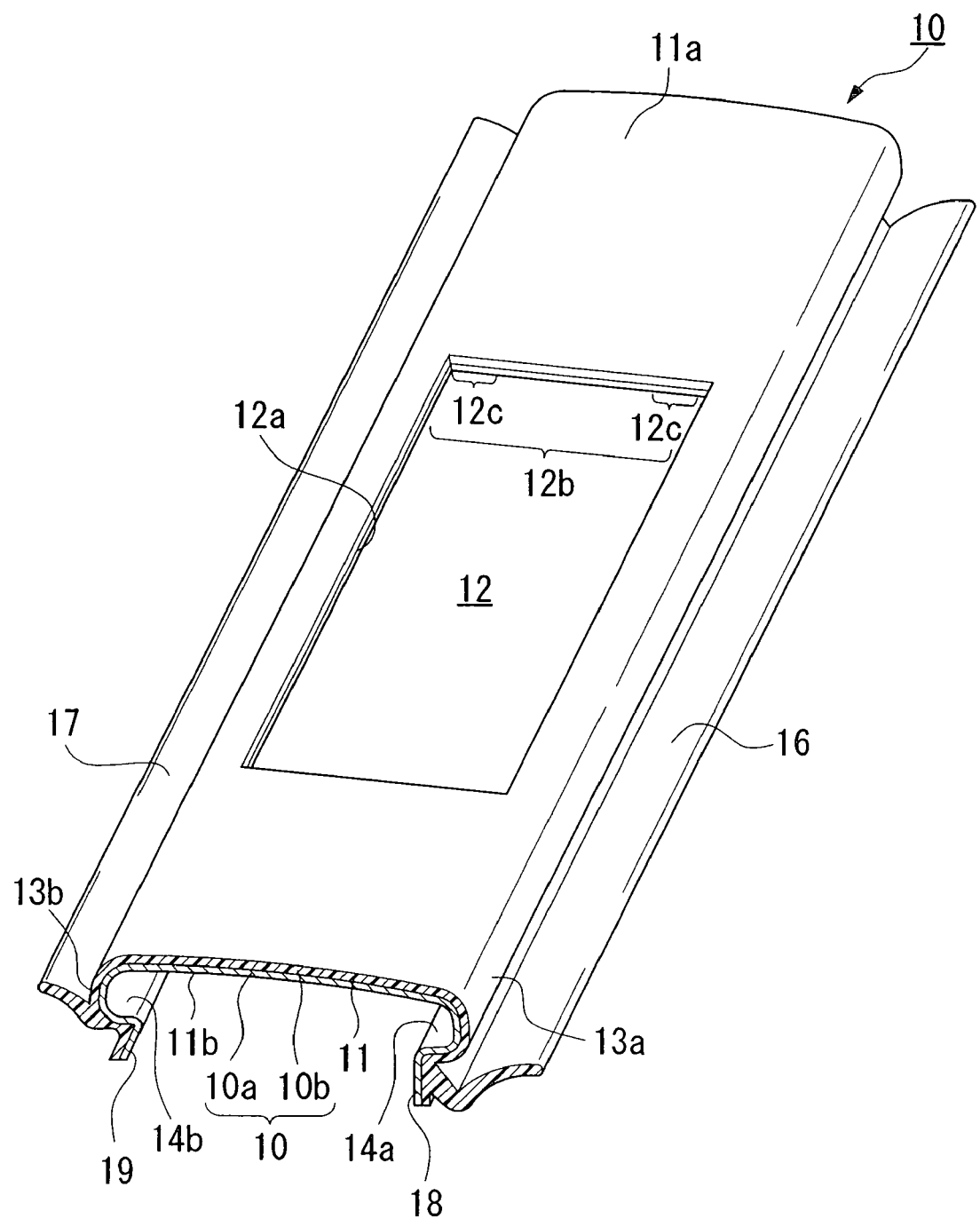
FIG. 3 is an external perspective view showing the vicinity of an opening of a molding body.
Figure 4:
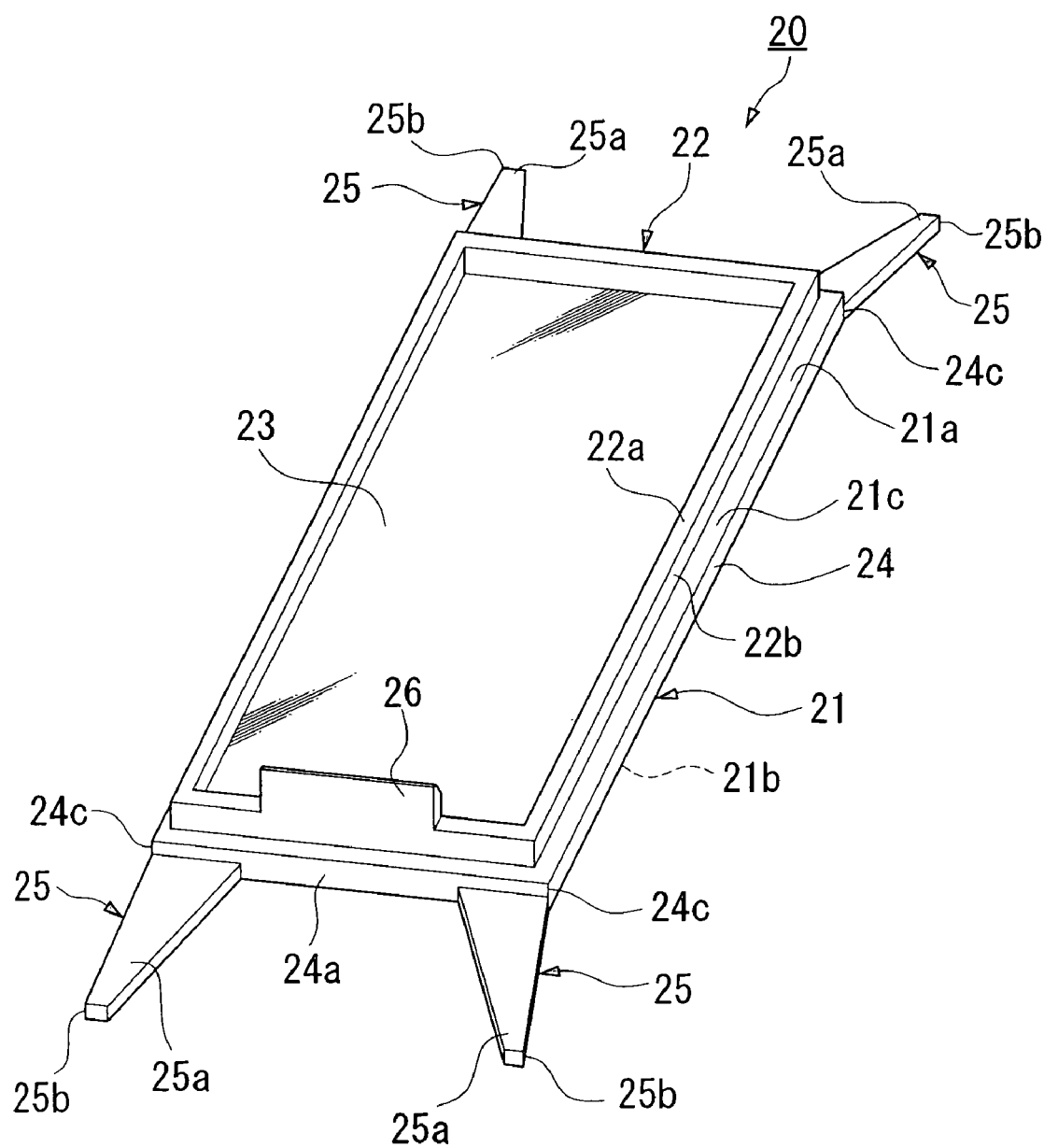
FIG. 4 is a perspective view showing an example of a slide plate.

As shown in FIGS. 2 through 4, a roof molding 1 is provided with an elongate molding body 10 and a slide plate 20 to open and close an opening 12 formed in an upper wall 11 of the molding body 10.

Molding body 10 comprises an elongate upper wall 11, shelf sections 14a and 14b, which face each other relatively from opposite sides in the widthwise direction (left and right directions in FIG. 2) of upper wall 11. In addition, the shelf sections 14a and 14b are formed opposed to and apart from reverse surface 11b of upper wall 11 by fold back parts 13a and 13b that are bent back to the inside in the widthwise direction of upper wall 11, and side walls 18 and 19 extending from the shelf sections 14a and 14b on both sides, and the molding body is formed into a shape having an approximately U-shaped cross-section so as to form internal space 15 on the reverse side of the molding body.

The aforementioned sidewalls 18 and 19 are formed along the longitudinal direction of molding body 10, and abut against bottom wall 4b of concave groove 4 at their lower edges 18b and 19b.

As shown in FIGS. 2 and 3, outer surface 11a of upper wall 11 of molding body 10 faces the opening side (upward in FIG. 2) of concave groove 4, and functions as an ornamental surface (outer surface 11a of upper wall 11 is hereinafter to be simply referred to as an ornamental surface).

Examples of molding body 10 include (a) that in which synthetic resin is co-extruded integrally onto a stainless steel or other metal strip formed by cold roll forming, (b) that which is formed from rigid synthetic resin only, and (c) that which is formed from rigid synthetic resin in which a core element having excellent expansion resistance (e.g., glass fiber) is embedded. In the present embodiment, as shown, for example, in FIG. 3, the molding is composed of roll formed metal section 10a, made of the stainless steel, as the core element, and resin section 10b co-extruded onto metal section 10a (equivalent to example (a) above).

Lips 16 and 17 are provided to the outside of the side sections of molding body 10 so as to abut elastically against outer side wall 4a and inner side wall 4b of concave groove 4. Lips 16 and 17 are flexibly formed from soft resin, and integrally molded with resin section 10b.

An opening 12 is formed in upper wall 11 of this molding body 10. In addition, shelf sections 14a and 14b are formed in opposition to reverse surface 11b of upper wall 11 and apart from upper wall 11 by fold back parts 13a and 13b. Although described later in detail, a slide plate 20 to open and close the aforementioned opening 12 is installed on shelf sections 14a and 14b and is able to slide along the longitudinal direction of molding body 10.

As shown in FIGS. 1 through 3, roof moldings 1 are provided on both sides in the direction of vehicle width of vehicle 9 and each roof molding has two openings 12 in the front and rear end of molding body 10 respectively corresponding to mounting sections 8a for attaching roof rails 8 to the vehicle (see FIG. 1). As shown in FIG. 3, openings 12 are formed into an elongate rectangular shape along the longitudinal direction of molding body 10.

Molding body 10 is attached, at places which avoid opening 12, by fastening clips (not shown) attached to the reverse surface 11b of upper wall 11 or fastening locking members (not shown) fixed to the concave grooves 4, for example.

A bracket 6 having welded nuts 6a is secured by welding to bottom wall 4b of concave groove 4 corresponding to opening 12.

The flanges 18a and 19a which vent inwardly are formed at the lower ends of both side walls 18 and 19 of the molding 10 to abut against the bottom wall 4b of the concave grooves 4. Notches 18c and 19c are formed at the position corresponding to the opening 12 of the flanges 18a and 19a so as to avoid interference with bracket 6.

Roof rail 8 is attached to vehicle roof 7 by inserting bolts, not shown, into welding nuts 6 and fastening bracket 6 to mounting section 8a of roof rail 8 in the state in which opening 12 is open.

FIGS. 4 and 5 show an example of a slide plate 20 for opening and closing the opening 12. This slide plate 20 has a rectangular plate body 21, and elastic sections 25 protruding to the outside from the vicinity of corners 24c of edge 24 of plate body 21. The plate body 21 is provided with an engaging section 22 protruding from a peripheral edge 21c so as to engage with opening 12, and a tab 26 protruding from an upper surface 22a of the engaging section 22.

Figure 6:
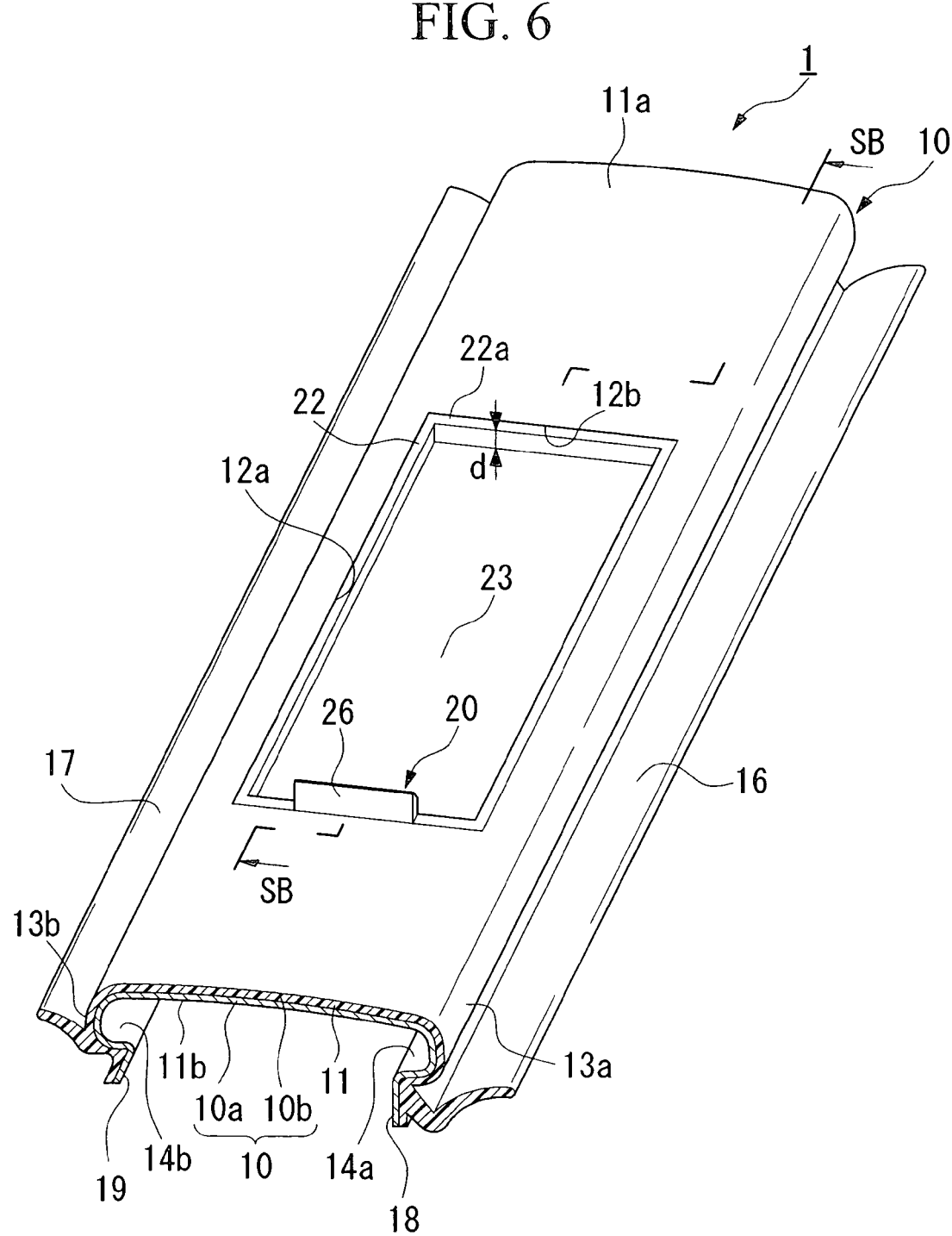
FIG. 6 is a perspective view showing the state in which an opening is closed.

As shown in FIGS. 2, 4, 5A, 5B and 7, an outer surface 22b of engaging section 22 of slide plate 20 is formed in the shape of a rectangular frame so as to align with an edge 12a (opening edge) of opening 12. The inside of engaging section 22 is a recess 23 that is indented from protruding edge 22a of engaging section 22. As a result, when slide plate 20 is slid, although opening edge 12a abuts against engaging section 22, it does not abuts against the recess 23, thereby it is possible to prevent scratching of the recess 23. In FIG. 6, for example, although the indication of depth d of recess 23 is exaggerated to clearly demonstrate that recess 23 is indented from protruding edge 22a of engaging section 22, it may also be of a degree that cannot be discerned visually. The preferable range of depth d of recess 23 is about 0.1 to 5 mm.

Figure 7:
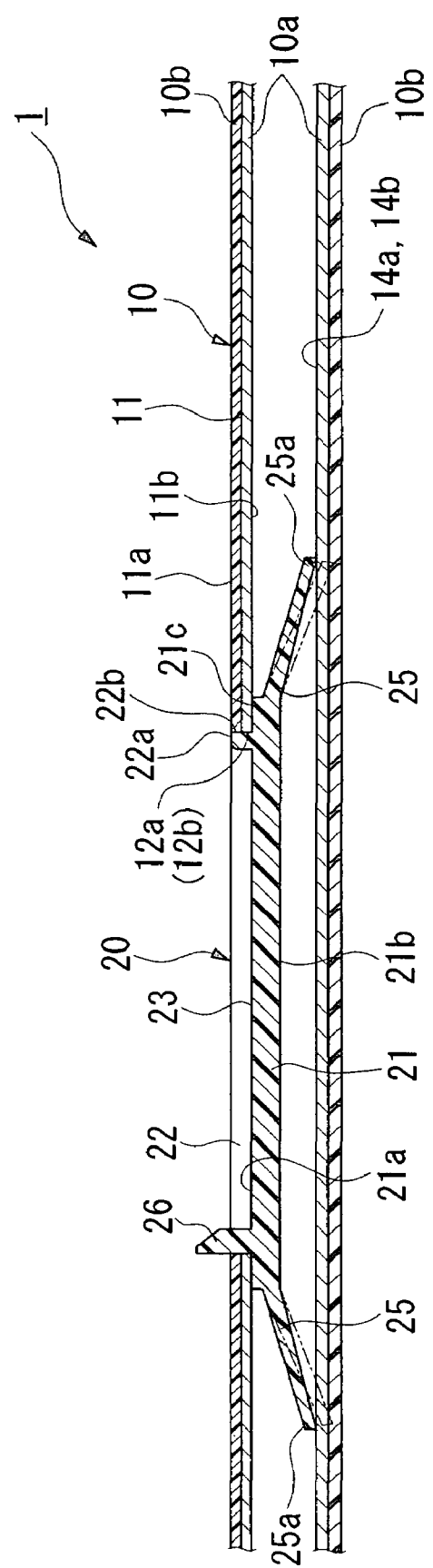
FIG. 7 is a longitudinal cross-sectional view taken along line SB—SB corresponding to the state shown in FIG. 6.

As shown in FIG. 7, the height of engaging section 22 of slide plate 20 (the height from peripheral edge 21c of plate body 21 to protruding edge 22a of engaging section 22) is approximately equal to the thickness of upper wall 11 in the vicinity of opening edge 12a of molding body 10 (the combined thickness of metal strip 10a and resin section 10b). As a result, in the state that slide plate 20 is in the closed position, protruding edge 22a of engaging section 22 is substantially in the same plane as ornamental surface 11a and forms a flat surface (in which there are no level differences).

As shown in FIG. 6, in the state that slide plate 20 is in the closed position, engaging section 22 engages with opening edge 12a and prevents exposure of opening edge 12a. Consequently, the edge of metal section 10a exposed in opening 12 is not visible, resulting in an attractive appearance in which molding body 10 and slide plate 20 appear to be integrated.

Engaging section 22 abuts against edge 12a of opening 12 when slide plate 20 is being slid to open and close the opening. In order to prevent scratching of engaging section 22, burrs on edge 12a of opening 12 are preferably removed with a file or sandpaper. Burrs are not required to be removed from the entire circumference of edge 12a of opening 12, but may only be removed from those sites where engaging section 22 makes contact.

In the present embodiment, burrs should at least be removed from both side edges 12c of side section 12b in the direction of opening (towards the top in FIGS. 3 and 8) of slide plate 20 where protruding edge 22a of engaging section 22 makes contact. Since the majority of surface 21a of plate body 21 is in the form of recess 23 that is indented from protruding edge 22a of engaging section 22. Removing burrs from the area where protruding edge 22a of engaging section 22 abuts is effective to prevent surface 21a of slide plate 20 from being scratched.

Figure 17:
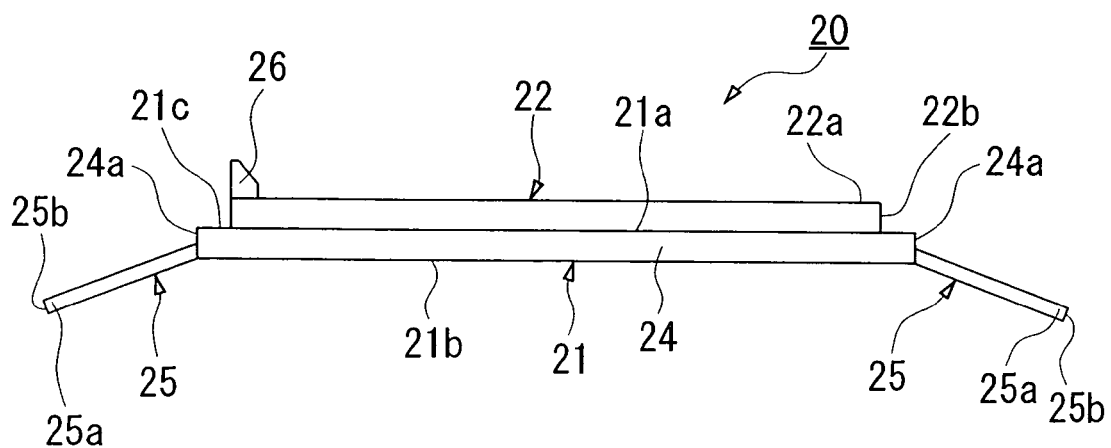
FIG. 17 is a front view showing a sixth example of a slide plate.

Furthermore, in the case of removing burrs over the entire width of side section 12b of opening edge 12a in the direction of opening of slide plate 20, as shown in FIG. 17, it is not necessary to form recess 23 in engaging section 22. In the case that there is no recess on upper surface 22a of engaging section 22, it is possible to design the whole surface of the outer surface of the engaging section 22 flush with the ornamental surface 11a of the molding body 10 and this improves the appearance of the molding body 10.

As shown in FIGS. 2, 5A and 5B, elastic sections 25 extend from short sides 24a of edge 24 of plate body 21 in a direction slightly inclined towards reverse side 21b of plate body 21 and to the outside in the widthwise direction.

As shown in FIGS. 6 through 9, slide plate 20 is installed between upper wall 11 of molding body 10 and shelf sections 14a and 14b.

Figure 9:
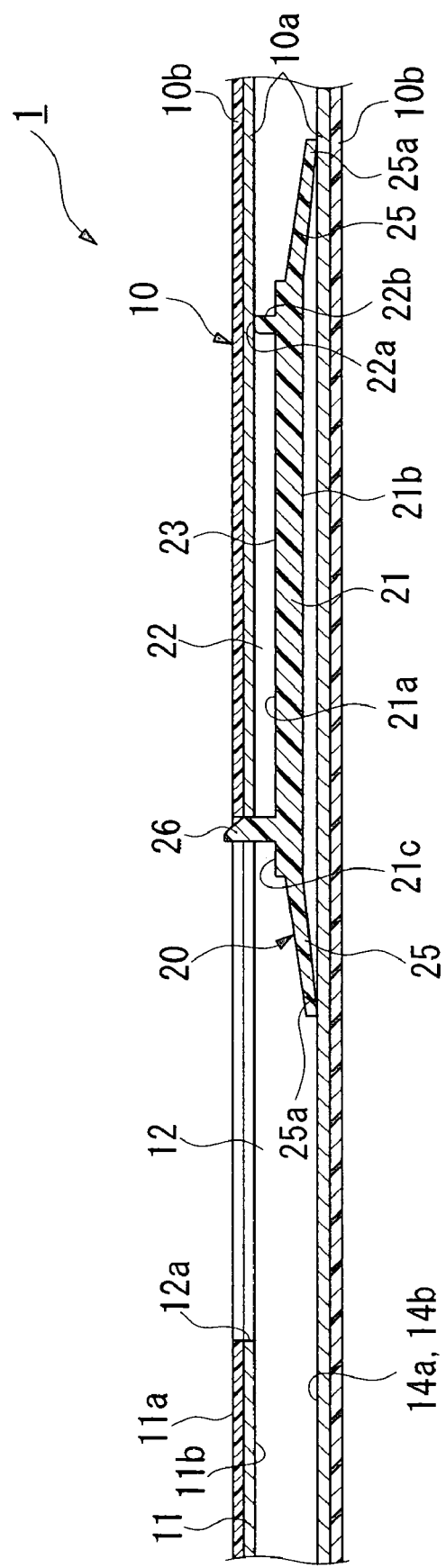
FIG. 9 is a longitudinal cross-sectional view taken along line SC—SC corresponding to the state shown in FIG. 8.

Slide plate 20 is housed within fold back parts 13a and 13b in the state in which elastic section 25 are placed on shelf sections 14a and 14b, and is able to slide in both directions in the longitudinal direction of molding body 10 (left and right directions in FIGS. 7 and 9).

Elastic sections 25 of slide plate 20 protrude from plate body 21 towards shelf sections 14a and 14b, and tips 25a of said elastic sections 25 at least abut against shelf sections 14a and 14b. As shown in FIG. 7, as a result of receiving a reactive force from shelf sections 14a and 14b, elastic sections 25 are elastically deformed so that tips 25a are deformed upwardly compared to their condition when free from external forces (the positions shown with the double-doted broken line of FIG. 7). Plate body 21 is then biased towards ornamental surface 11a due to the elastic force of elastic sections 25.

When slide plate 20 is moved to the open position, slide plate 20 is pushed against upper wall 11 and becomes stationary due to frictional force. Consequently, as long as slide plate 20 is not operated, it is difficult to return in the direction in which it closes opening 12, thereby facilitating the work of attaching rooftop parts 8.

When operating slide plate 20, as a result of slide plate 20 pushing in so as to separate from upper wall 11, the frictional force with upper wall 11 is reduced and slide plate 20 is able to be moved easily. When the slide plate 20 is moved to the closed position, slide plate 20 is engaged with opening 12 by the biasing force of elastic sections 25. In this manner, opening 12 can be opened and closed with an extremely simple operation, thereby resulting in a superior feel of operation.

In addition, elastic sections 25 protrude to the outside in the widthwise direction from plate body 21 so that outside sections 25b, which are the ends of slide plate 20 that protrude to the outside in the widthwise direction, approach or abut against the inner surface of fold back parts 13a and 13b. Consequently, when slide plate 20 is displaced so as to shift from the center in the widthwise direction of molding body 10, elastic sections 25 abut against the inner surfaces of fold back parts 13a and 13b causing them to receive reactive force from said fold back parts 13a and 13b. As a result, the action which returns slide plate 20 to the center in the widthwise direction is realized and displacement of slide plate 20 in the widthwise direction is restricted. Namely, fold back parts 13a and 13b function as guides that guide slide plate 20.

As shown in FIGS. 6 and 7, when slide plate 20 closes opening 12 of molding body 10 (in the state in which slide plate 20 is in the fully closed position), plate body 21 is biased towards ornamental surface 11a. Accordingly, engaging section 22 is engaged with opening 12, outer surface 22b of engaging section 22 and peripheral edge 21c extending further outwardly from engaging section 22 abut against opening edge 12a and reverse surface 11b, respectively. In addition, tab 26 protrudes further upwardly than ornamental surface 11a.

Figure 8:
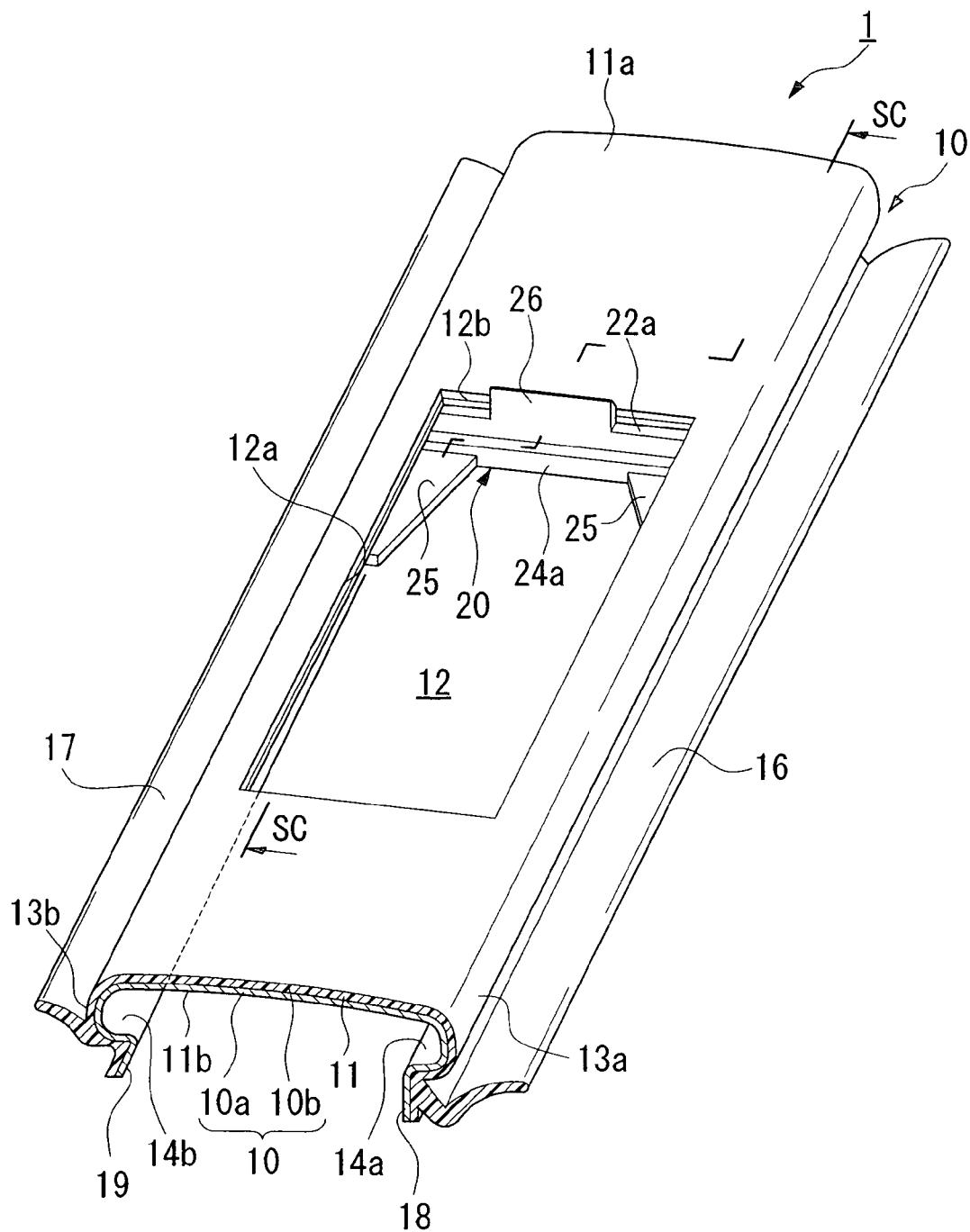
FIG. 8 is a perspective view showing the state in which an opening is open.

As shown in FIGS. 8 and 9, when opening 12 of molding body 10 has been opened (in the state in which slide plate 20 is at the fully open position), plate body 21 is depressed more than when opening 12 is closed, elastic sections 25 bias edge 22*a* of engaging section 22 toward reverse surface 11*b* of upper wall 11 so that edge 22*a* abuts against reverse surface 11*b*. The locations where slide plate 20 makes contact with molding body 10 consist of tips 25*a* of elastic sections 25, shelf sections 14*a* and 14*b*, protruding edge 22*a* of engaging section 22 and bottom surface 11*b* of upper wall 11, and since contact is made over an extremely narrow surface area, there is little frictional force and slide plate 20 can be slid with a low amount of force.

Since tab 26 protrudes from protruding edge 22*a* of engaging section 22, sliding of slide plate 20 can be stopped when its contacts opening edge 12*a*. Namely, tab 26 functions as a stopper that stops the sliding movement of slide plate 20 in the state in which opening 12 is open. As a result, slide plate 20 is prevented from going under the reverse side of upper wall 11 of molding body 10 and being unable to be pulled out.

When opening 12 of molding body 10 is being closed from the open state, by pushing tab 26 by hand, for example, the sliding of slide plate 20 can be started and slide plate 20 can be closed. Slide plate 20 engages with opening 12 on its own as a result of the biasing force applied by elastic sections 25 when it is positioned directly below opening 12.

In this manner, according to the roof molding 1 of the present embodiment, opening 12 can be opened and closed with an extremely simple operation.

According to the present invention, since a slide plate can be installed directly near the opening of a molding body, it is not necessary to produce other members for guiding the sliding movement of the slide plate and attach them to the molding body. Thus, it is unnecessary to prepare such a cover member in the prior art. Since a step in which the cover body is fused to the molding body is also omitted, costs can be reduced.

In addition, it is possible to make the size of the opening in the molding small. In other words, although the opening of the prior art was required to be at least twice the size of the opening of the present invention. The opening in the prior art needed to be large enough for mounting roof-rails and for an opening to attach a cover member. However, in the present invention, it is only necessary for the opening to be of a size sufficient for mounting the roof-rails. Thus, since the size of opening 12 can be made to be half that or less of conventional products, in addition to securing rigidity around opening 12 of molding body 10, the effects of thermal contraction of slide plate 20 can be inhibited.

Here, a concrete explanation is provided regarding the effects of thermal contraction of slide plate 20. Furthermore, this explanation is merely an example, and is not intended to limit the present invention.

In the case of, for example, forming slide plate 20 from ABS resin and making length L of slide plate 20 10 cm, since the coefficient of linear thermal expansion of ABS resin is $\alpha = 85 \times 10^{-6}/°$ C., elongation $\Delta L$ in the case temperature difference $\Delta t$ is 40° C. becomes 0.34 mm. The clearance (gap) between opening 12 and slide plate 20 should then be designed so as to allow for an elongation $\Delta L$ of slide plate 20 to roughly the degree described above. As a result, the occurrence of strain resulting from both edges 24*a* on the short side of plate body 21 simultaneously contacting edge 12*a* of opening 12 can be inhibited. Since the gap between edges 24*a* on the short side of plate body 21 and edge 12*a* of opening 12 (average per one side) is equal to half of elongation $\Delta L$ ($\Delta L/2$), namely about 0.17 mm, a gap of this size is visually inconspicuous thereby resulting in an attractive appearance.

Next, an explanation is provided of a second embodiment of the roof molding of the present invention with reference to FIGS. 10 through 13.

In FIGS. 10 through 13, the same reference symbols as used in FIGS. 1 through 9 are used to indicate the same or similar constituents of FIGS. 1 through 9, and their repeated explanations are omitted.

In a roof molding 30 of the present embodiment, slide plate 20 has a projection section 27 comprised of extending section 27*a* extending from one direction of short side 24*a* of edge 24 of plate body 21, and a vertical lever section 27*c* perpendicularly provided from an end 27*b* of said extending section 27*a*.

Figure 11:
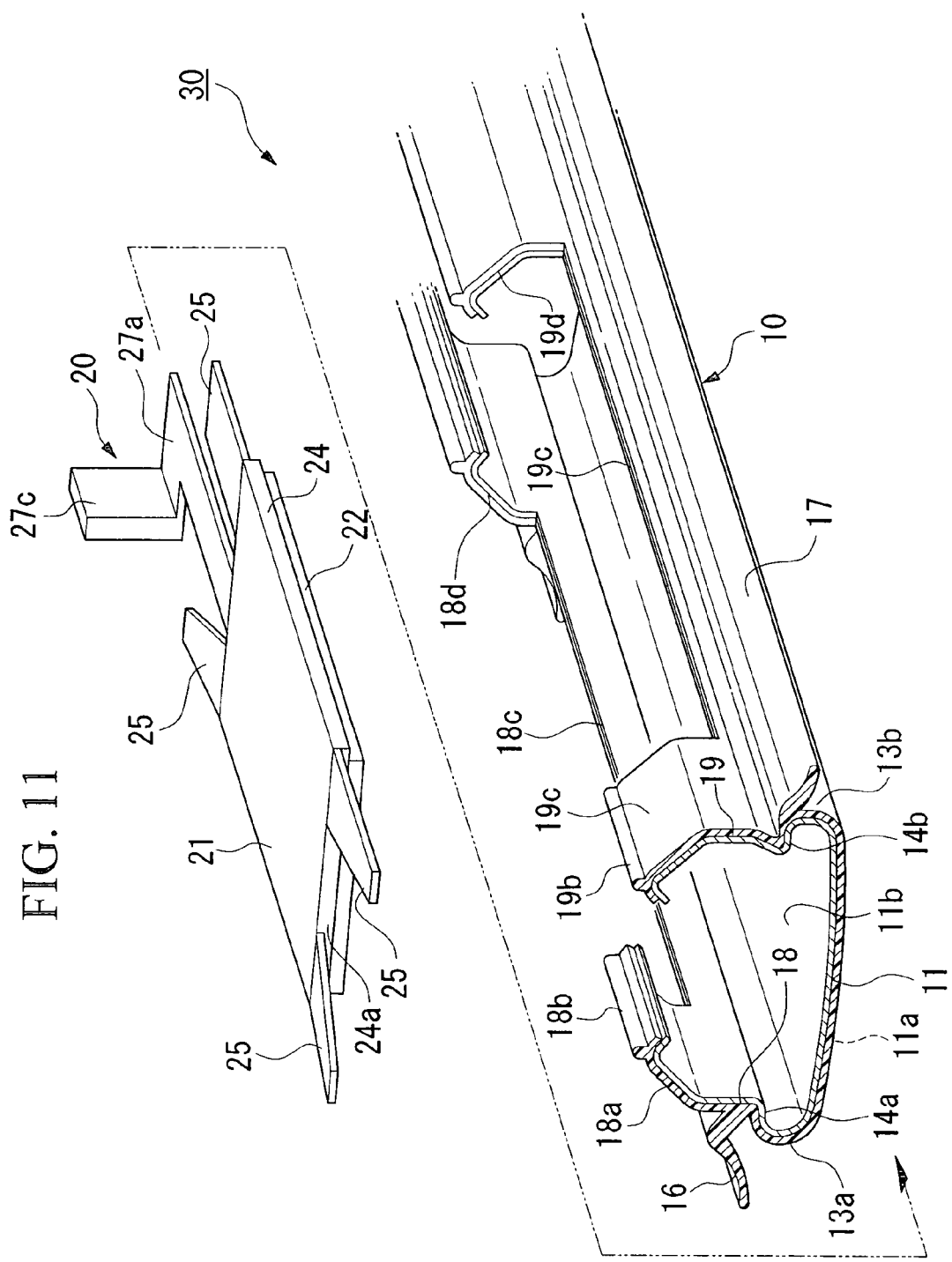
FIG. 11 is an exploded perspective view showing an example of a roof molding that uses the slide plate shown in FIGS. 10A and 10B.
Figure 12:
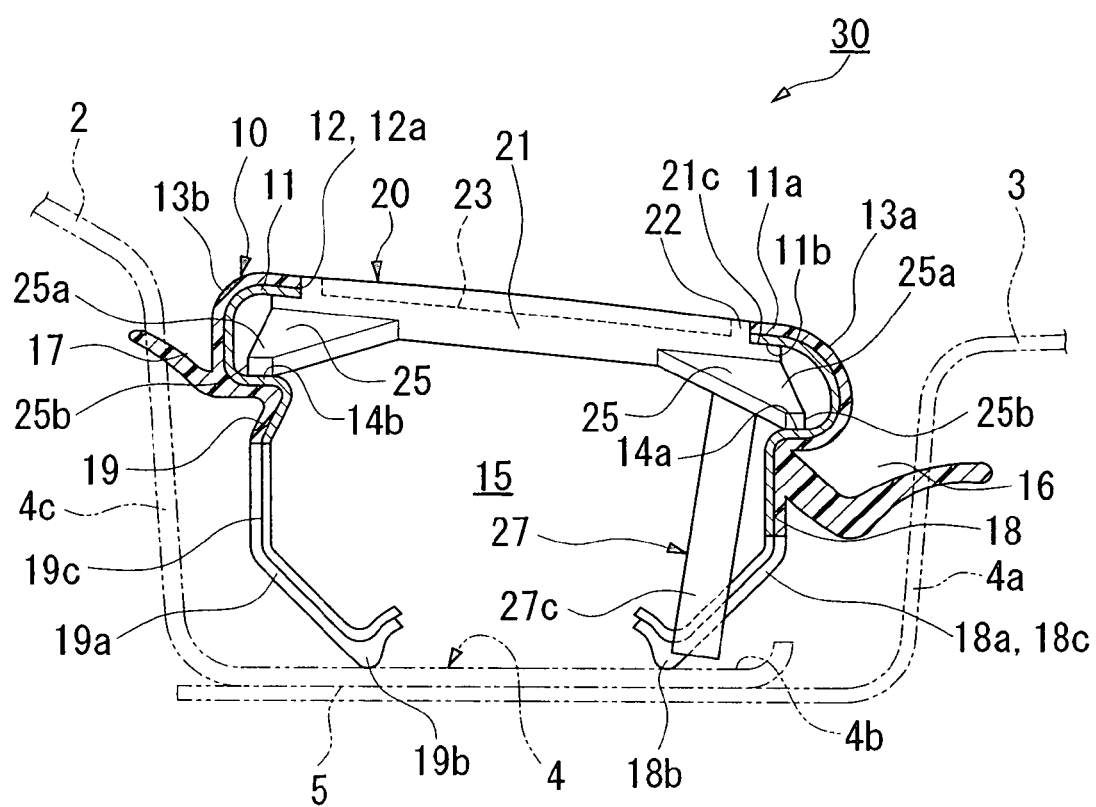
FIG. 12 is a horizontal cross-sectional view showing the state in which an opening of the roof molding of FIG. 11 is closed.

As shown in FIGS. 10 and 11, here extending section 27*a* is formed into approximately an L-shape while avoiding interference with elastic section 25. As shown in FIG. 12, vertical lever section 27*c* protrudes to the outside in the direction of vehicle width by means of extending section 27*a* so as to abut against an edge 18*d* of notch 18*c* formed in flange 18*a* of side wall 18 to the outside in the direction of vehicle width (to the side of pillar outer panel 3, right side of FIG. 12).

Figure 13:
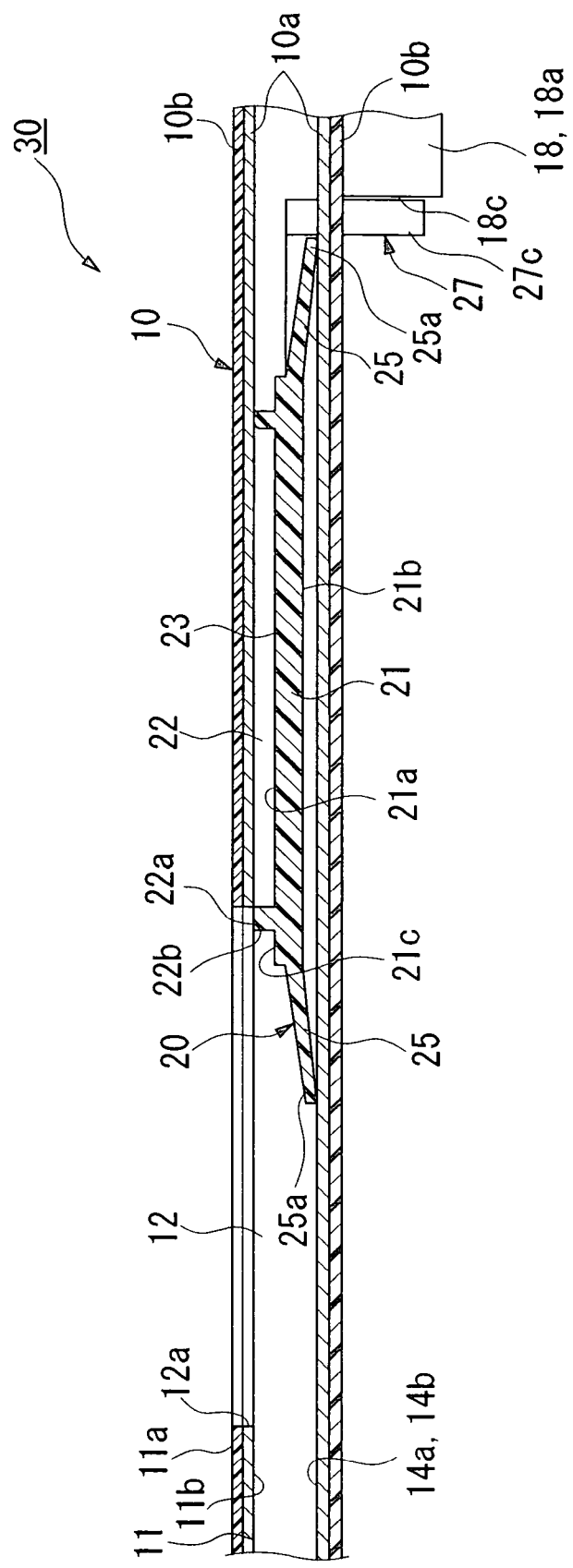
FIG. 13 is a longitudinal cross-sectional view showing the state in which an opening of the roof molding of FIG. 11 is open.

As shown in FIG. 13, the positional relationship between edge 18*d* of notch 18*c* contacted by vertical lever section 27*c* and opening 12 is such that, while a portion of plate body 21 is exposed from opening 12, vertical level 27*c* contacts said notch edge 18*d* to stop sliding movement of plate body 21. As a result, slide plate 20 is prevented from going under the reverse side of upper wall 11 of molding body 10 and from being unable to be pulled out.

Furthermore, there are no particular restrictions on the shape of projecting section 27, and it is only required to be formed so that, together with slide plate 20 being stopped in the state in which opening 12 is open, said projecting section 27 does not obstruct the sliding movement of slide plate 20 by avoiding interference with elastic section 25, bracket 6 and so forth over the entire range of sliding movement of slide plate 20 as a result of making contact with edges 18*d* and 19*d* of notches 18*c* and 19*c* formed in one or both of side walls 18 and 19.

Similar to the roof molding 1 of the first embodiment, opening and closing of opening 12 in roof molding 30 of the resent embodiment can be realized by sliding slide plate 20 along shelf sections 14*a* and 14*b* of molding body 10. In the present embodiment, since projecting section 27, which stops the sliding movement of slide plate 20 in the state in which opening 12 has been opened, protrudes to the side of reverse side 21*b* of slide plate 20 and is not exposed from opening 12, even in the state in which opening 12 is closed, a section that protrudes from opening 12 can be eliminated, thereby resulting in an attractive appearance. In addition, although there is the risk of slide plate 20 being opened as a result of mistakenly contacting the projecting section during cleaning of the roof and so forth in the case a projecting section protrudes from opening 12, this problem does not occur in roof molding 30 of the present embodiment.

Although the above has provided an explanation of the present invention based on its preferred embodiments, the present invention is not limited to these embodiments, but rather can be modified in various ways within a range that does not deviate from the gist of the present invention. Furthermore, in the following drawings that show variations of the present invention, the same reference symbols as those in the drawings used in the aforementioned explanation are assigned to the same or similar constituents in the previous explanation, and their repeated explanations are omitted.

Figure 14A:
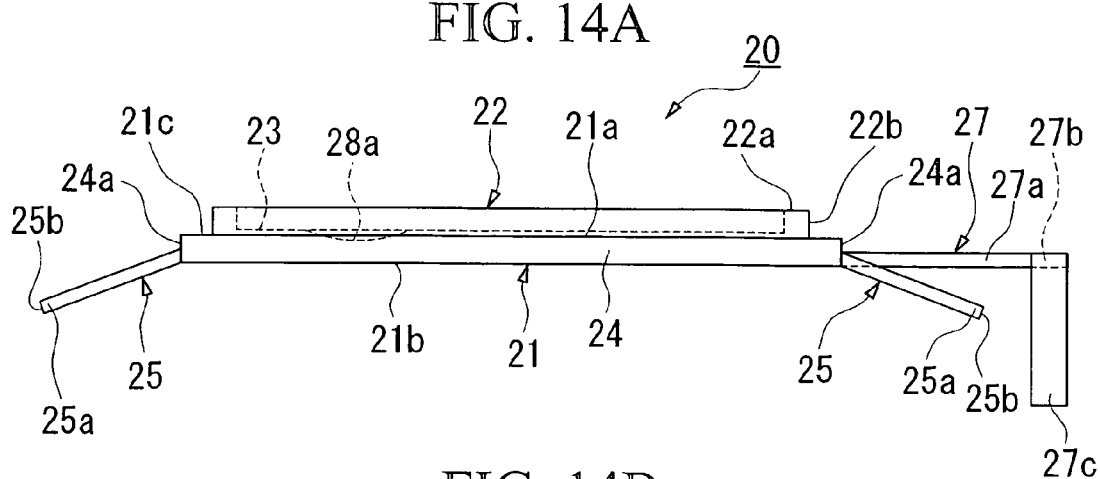
FIG. 14A is a front view and FIG. 14B is a perspective view showing a third example of a slide plate.
Figure 14B:
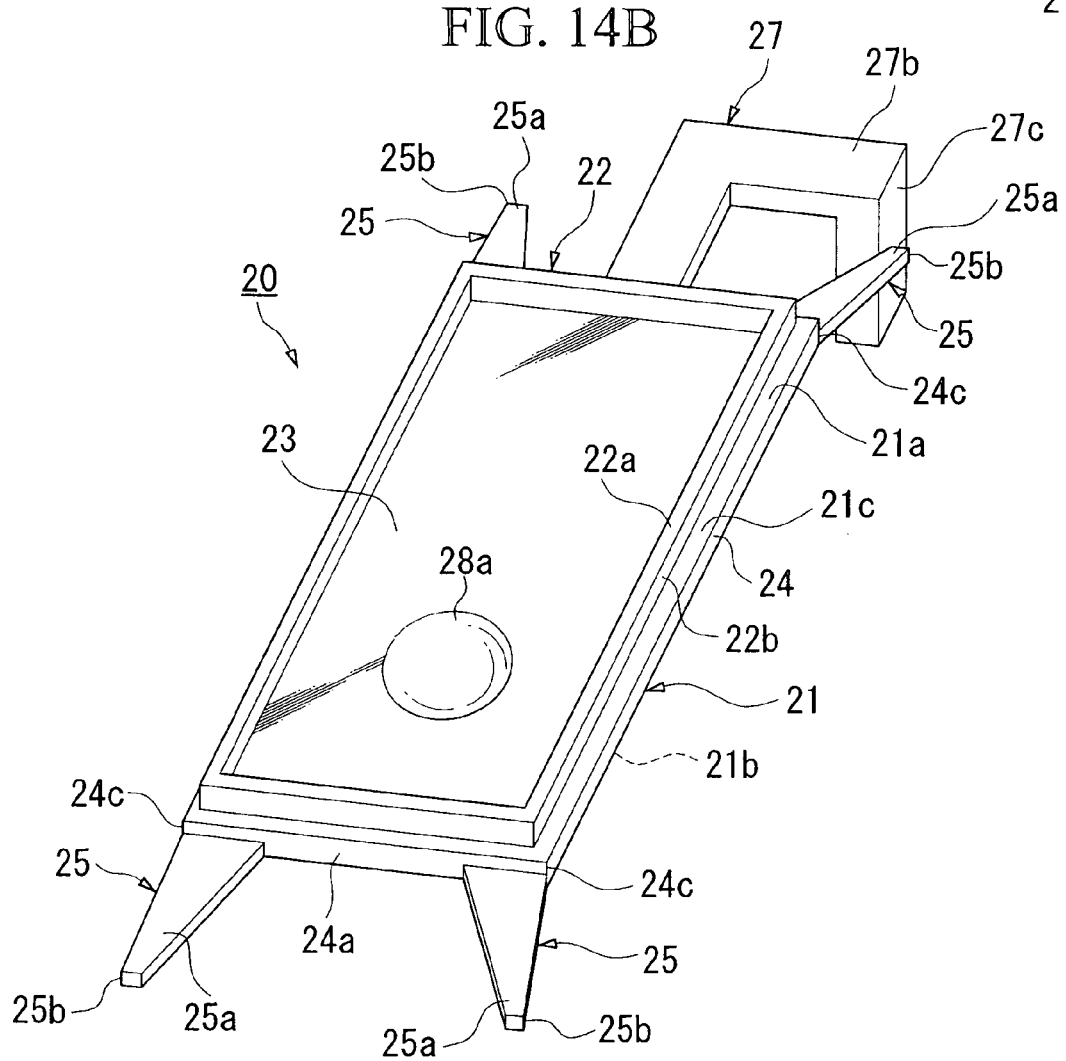
Figure 15:
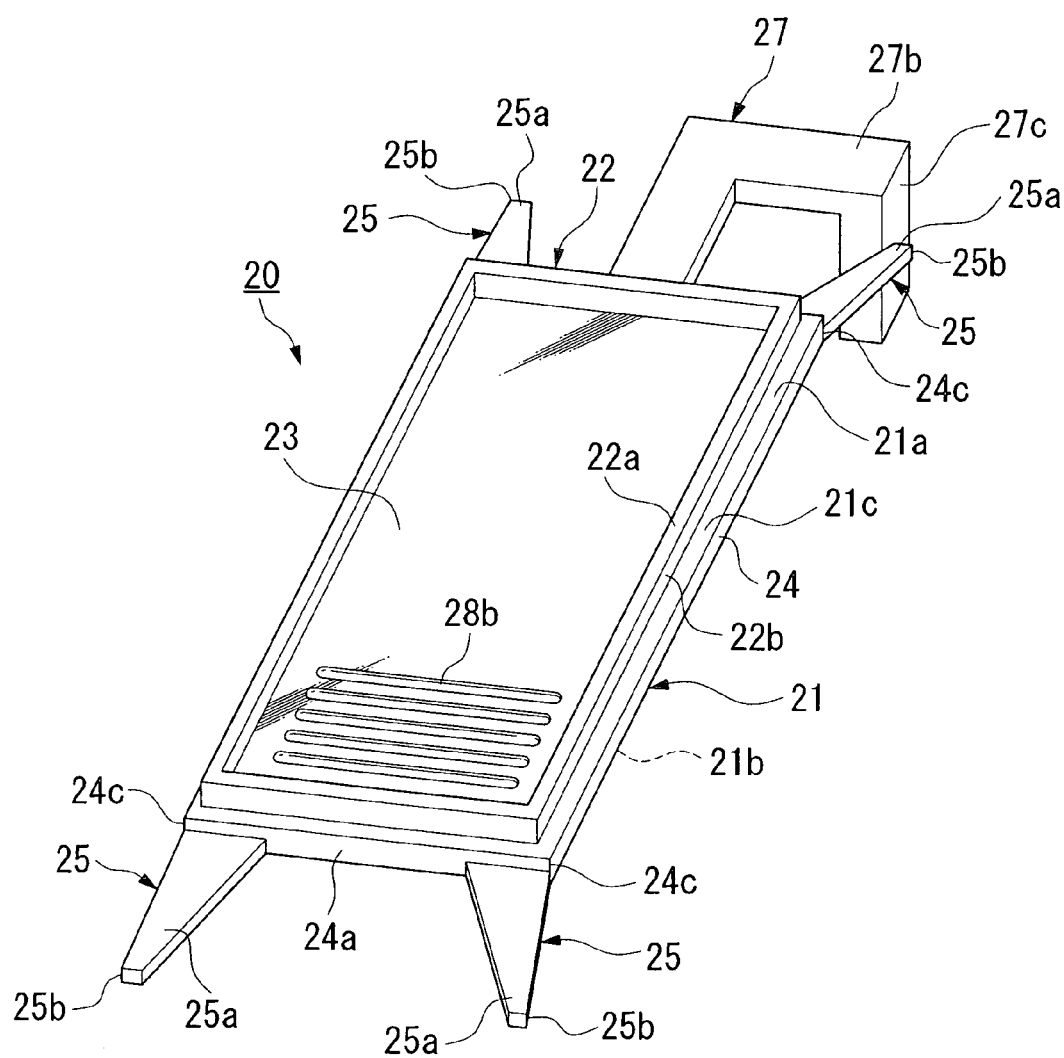
FIG. 15 is a perspective view showing a fourth example of a slide plate.

For example, a recess 28a as shown in FIGS. 14A and 14B or knurled grooves 28b as shown in FIG. 15 may be provided in the top side of plate body 21 instead of tab 26 serving as a handle. When the balls of the fingers and so forth are placed on the top side of plate body 21, there is less likelihood of slipping, enabling slide plate 20 to be moved easily. Handle 26 that protrudes beyond ornamental surface 11a can then be omitted when fitting engaging section 22 in opening 12.

The present invention preferably has a stopper that stops the sliding movement of the slide plate when the opening is open, and in the aforementioned embodiments, a tab was shown that serves as a stopper capable of making contact with an opening edge or notch of the molding body. In the present invention, other constitutions may be employed for the aforementioned stopper, and an example of such a constitution that can be employed consists of forming a tab on the inner surface of the molding body that stops the sliding movement of the slide plate by contacting the slide plate when the opening is opened.

Figure 16:
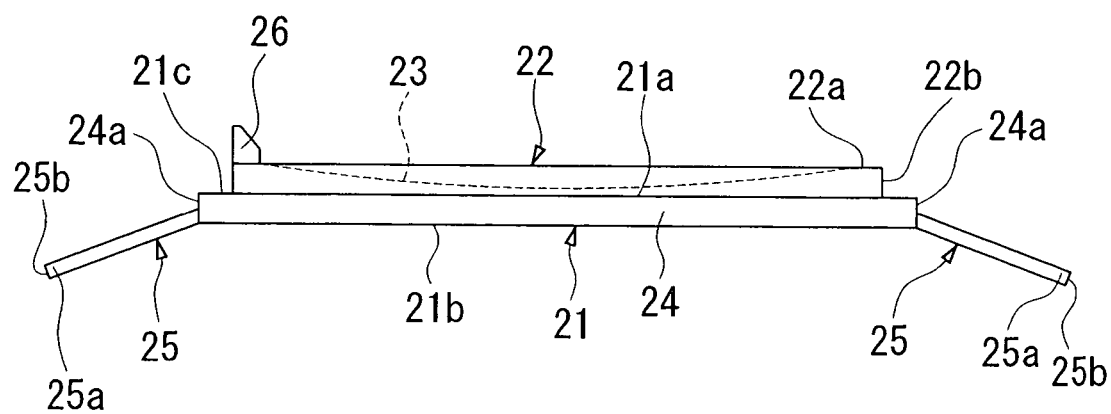
FIG. 16 is a front view showing a fifth example of a slide plate.

In the roof moldings of the aforementioned embodiments, although recess 23 of slide plate 20 is formed at a level difference from protruding edge 22a of engaging section 22, the present invention is not particularly limited to this. For example, as shown in FIG. 16, recess 23 may have a curved surface in the shape of a curve that gradually becomes lower moving from protruding edge 22a of engaging section 22. As a result, the level difference in the vicinity of the border between protruding edge 22a of engaging section 22 and recess 23 is inconspicuous when opening 12 of the roof molding is closed, and damage to the top side of plate body 21 can be inhibited by preventing abrasion between edge 12a of opening 12 and recess 23 while giving the appearance of a flat surface. In addition, recess 23 makes it difficult for dirt to accumulate and facilitates easy cleaning.

In addition, as shown in FIG. 17, upper surface 22a of engaging section 22 may be in the form of a surface that is free of any level differences without forming recess 23 in engaging section 22. In this case, the entire surface of engaging section 22 and ornamental surface 11a of molding body 10 can be made flush.

Figure 18A:
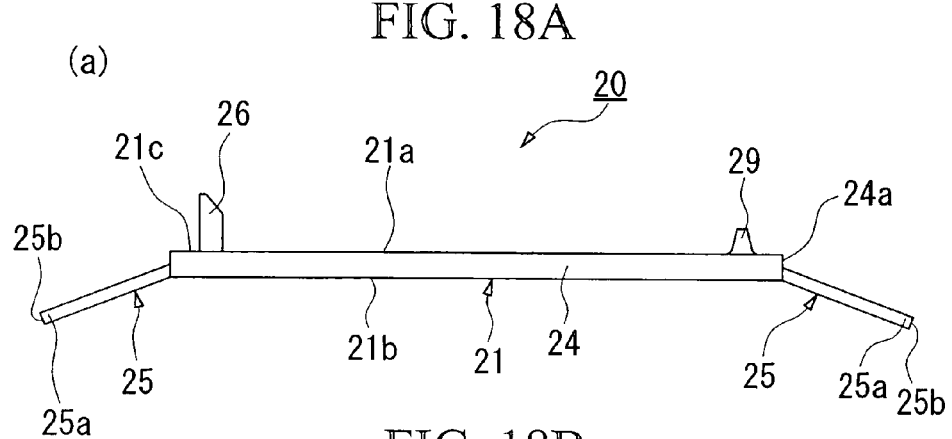
FIG. 18A is a front view and FIG. 18B is a perspective view showing a seventh example of a slide plate.
Figure 18B:
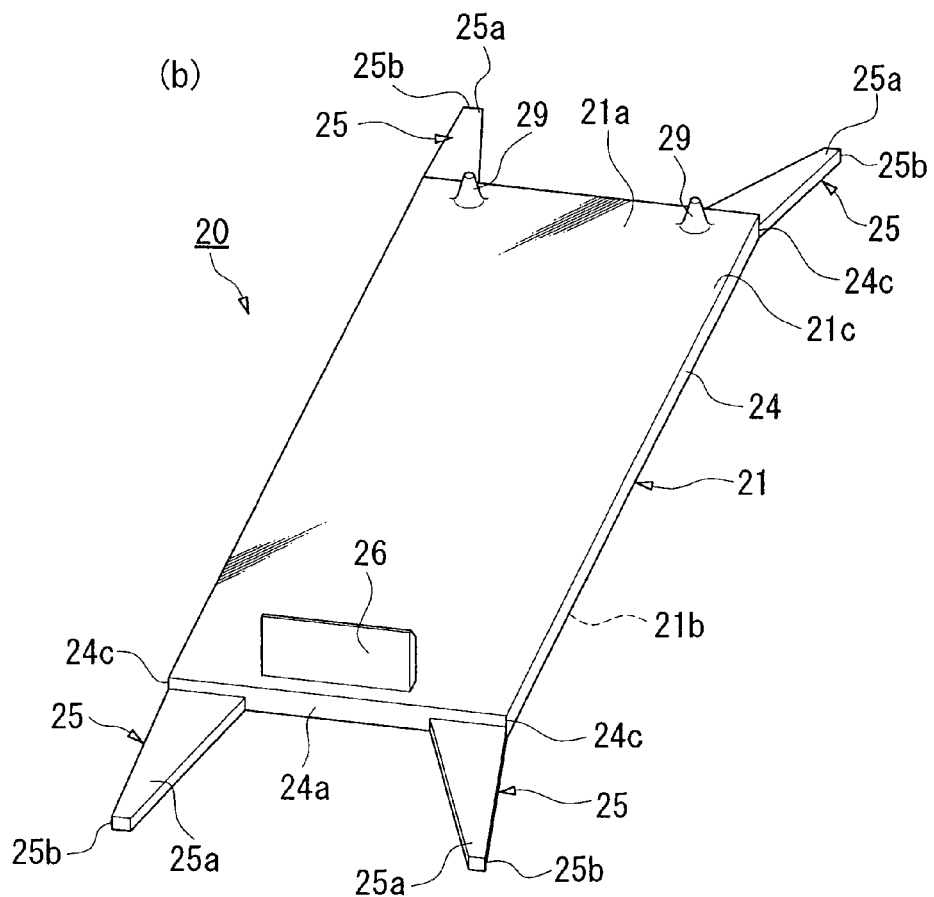

In the aforementioned embodiments, although engaging section 22 of slide plate 20 was formed into the shape of a frame so as to engage along the entire circumference of opening edge 12a, the present invention is not particularly limited to this. For example, as shown in FIG. 18, the present invention may have one or a plurality of projections 29 (pointed projections) or ridges (projections extending in a single direction). In this case as well, slide plate 20 can be positioned and engaged with edge 12a of opening 12 and a stable state can be maintained when opening 12 is closed.

In the aforementioned embodiments, although an example was shown in which notches 18c and 19c are formed to prevent interference with a bracket, the present invention is not particularly limited to this. For example, by attaching molding 1 to a body with an attachment means different from the aforementioned embodiments, notches 18c and 19c are not required to be provided in the case side walls 18 and 19 can be formed substantially linearly from fold back parts 13a and 13b.

Figure 19:
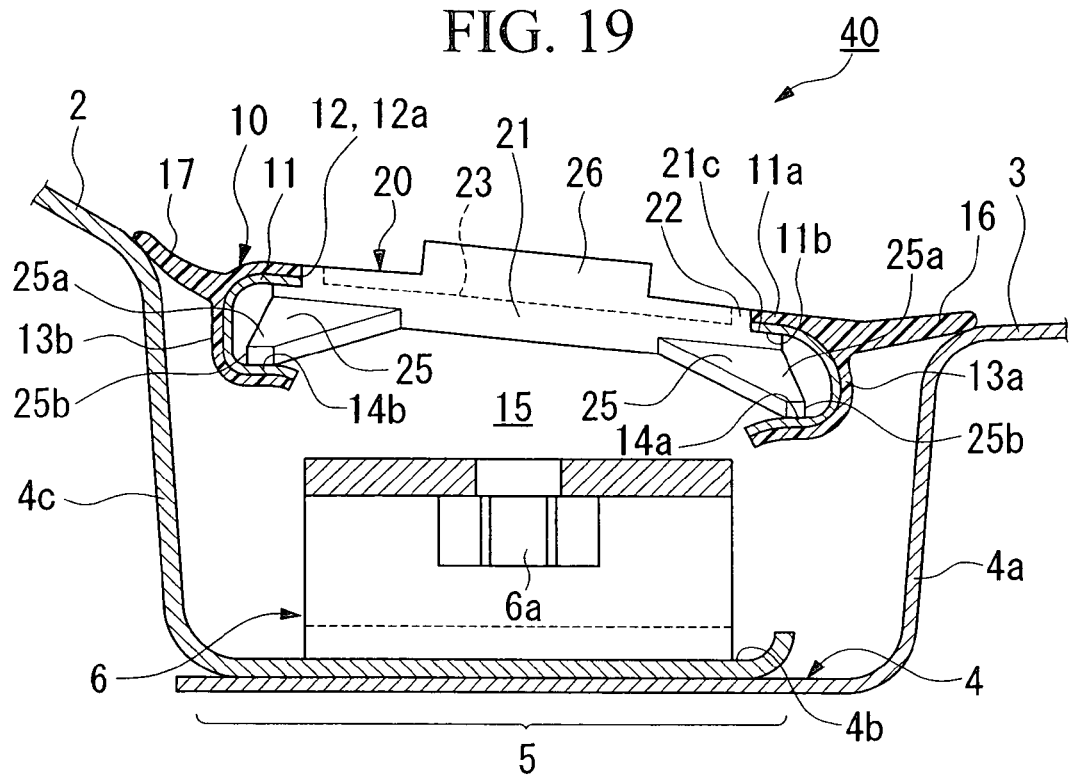
FIG. 19 is a cross-sectional view showing a first variation of a roof molding.

In addition, although side walls 18 and 19 are integrally formed from shelf sections 14a and 14b facing bottom walls 4b of concave grooves 4 in the aforementioned embodiments, side walls 18 and 19 are not required elements. In the case of being able to apply another known mounting method for attaching molding body 10 to a body, side walls 18 and 19 can be omitted as in roof molding 40 shown in FIG. 19. Examples of other known mounting methods include a structure in which one clip is engaged with one of shelf sections 14a and 14b, while the other clip is engaged with the other shelf section 14a or 14b.

Figure 20:
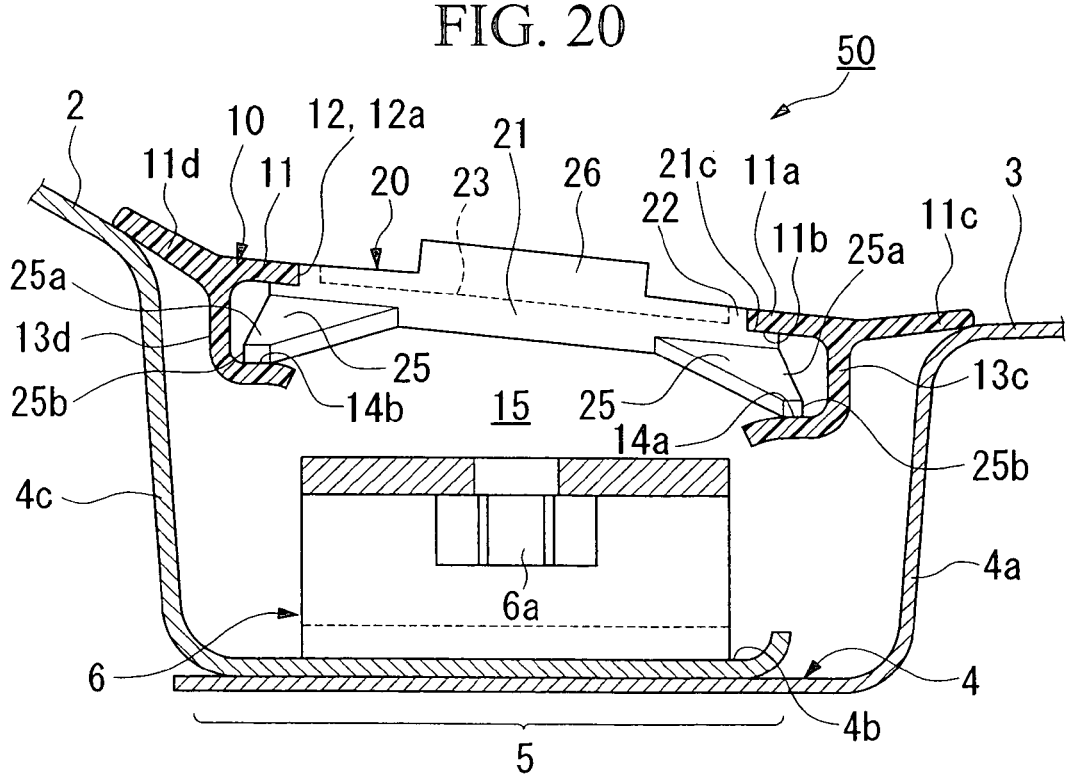
FIG. 20 is a cross-sectional view showing a first variation of a roof molding.

Moreover, in the case of upper wall 11 that forms outer surface 11a of molding body 10 is present beyond the opening width of concave groove 4 as in roof molding 50 shown in FIG. 20, shelf sections 14a and 14b may protrude from a location displaced towards the center from both side edges 11c and 11d in the widthwise direction of upper wall 11, and may be formed by bent sections 13c and 13d that bend to the inside in the widthwise direction of upper wall 11. Furthermore, bent sections 13c and 13d are able to function in the same manner as fold back parts 13a and 13b with the exception of not protruding from both side edges 11c and 11d of upper wall 11.

As has been explained above, according to a vehicle roof molding of the present invention, a slide plate can be housed between an upper wall and shelf sections to enable said slide plate to be guided while being able to slide between them. Consequently, a cover body provided with guiding sections for the slide plate is not required, and since the slide plate can be installed directly in the vicinity of an opening of a molding body, the number of parts can be reduced and costs can be lowered. Since the slide plate has no undercut section therein, it is possible to reduce the cost of the mold.

In addition, since the slide plate is biased towards the upper wall of the molding body from the shelf sections by the reactive force of elastic sections, the slide plate is pushed against the upper wall and kept stationary by frictional force when the opening is opened. When the slide plate is operated, the frictional force with the upper wall is reduced as a result of the slide plate being pushed in so as to move away from the upper wall, thereby allowing the slide plate to be operated easily. When the slide plate 20 is moved to the closed position, slide plate 20 is engaged with opening 12 by biasing force of the elastic sections. In this manner, the opening can be opened and closed by an extremely simple operation.

Since the slide plate can be installed directly in the vicinity of the opening of the molding body, it is possible to make the size of the opening in the molding small. Consequently, together with securing rigidity around the opening of the molding body, the effects of thermal contraction of the slide plate can be inhibited.

In the case the shelf sections are formed by fold back parts that are bent back inwards in the widthwise direction of the upper wall from said upper wall, the upper wall and shelf sections can be integrally molded by bending back, thereby making it possible to reduce costs. In addition, in the case of a molding containing a metal section for the core, the metal section can be made to be continuous from the upper wall to the shelf sections thereby resulting in superior strength and durability.

In the case the surface side of the slide plate has a tab which abuts against the edge of the opening when the slide is moved to the fully open position, the tab fulfills the role of a stopper, thereby eliminating the risk of the entire slide plate being concealed on the bottom side of the molding body. In addition, this can also be used as a handle (knob) when sliding the slide plate.

When the slide plate is at the position where it fully closes the opening, together with engaging with the opening edge of the opening, in the case of having an engaging section that forms substantially the same plane with the upper wall, the edge of the opening of the molding is concealed by said engaging section thereby resulting in an attractive appearance. In addition, in the case the opening edge is exposed, although it is necessary to remove any burrs from the opening edge so as to prevent injury to the fingers and so forth when cleaning the molding, as a result of the edge of the opening being concealed by the engaging section, this removal of burrs from the opening edge can be omitted, thereby reducing costs and ensuring safety.

In the case side walls in contact with the bottom walls of concave grooves formed in the chassis panel are formed over the entire lengthwise direction of the molding body, the molding sinks into the concave grooves when the slide plate is opened and closed, thereby eliminating the risk of deformation of the shelf sections and so forth while also resulting in satisfactory workability.

In the case the edge of the bottom side of the slide plate has a projecting section able to contact the edge of a notch in the molding body when the slide plate is opened and closed, the projecting section fulfills the role of a stopper when the slide plate is opened, thereby making it possible to stop the movement of the slide plate. In addition, since said projecting section is provided on the bottom side of the slide plate, there are few irregularities in the bottom side exposed from the opening, thereby resulting in an attractive appearance.

What is claimed is:

1. A vehicle roof molding comprising an elongate molding body having an upper wall in which an opening is formed in the outer surface thereof and a slide plate to open and close the opening; wherein
    the molding body has shelf sections formed relative to the widthwise direction so as to oppose and being apart from a reverse surface of the upper wall, and
    the slide plate is movably installed on the shelf sections corresponding to said opening so as to be able to slide along the longitudinal direction of the molding body; and,
    the slide plate has elastic sections that protrude towards the shelf sections and bias the slide plate towards the upper wall by receiving a reactive force from the shelf sections.

2. A vehicle roof molding according to claim 1, wherein the shelf sections are formed by fold back parts that are bent back inward from the upper wall in the widthwise direction of the upper wall.

3. A vehicle roof molding according to claim 1, wherein the slide plate has a tab on the top surface side of the slide plate which abuts against the edge of the opening when the slide plate is moved to the open position of the opening.

4. A vehicle roof molding according to claim 1, wherein the slide plate has an engaging section that engages with the opening edge of the opening and forms substantially a surface which is flush with the upper wall when the slide plate is moved to the closed position.

5. A vehicle roof molding according to claim 1, wherein side walls extending from the shelf sections on both sides are formed in the molding body over the entire length of the molding body, and the side walls abut against bottom walls of the concave groove formed in the body panel.

6. A vehicle roof molding according to claim 5, wherein the molding body has a notch that has been partially removed in the vicinity of the opening in one or both of the side walls, and
    the slide plate has a projection, on the edge or reverse side thereof, to abut against the edge of the notch when the slide plate is moved to an open position.

* * * * *